United States Patent [19]

Witman

[11] Patent Number: 4,935,286
[45] Date of Patent: Jun. 19, 1990

[54] STAIN AND SCRATCH RESISTANT RESILIENT SURFACE COVERINGS

[75] Inventor: Jack H. Witman, Lancaster, Pa.

[73] Assignee: Armstrong World Industries, Inc., Lancaster, Pa.

[21] Appl. No.: 945,831

[22] Filed: Dec. 23, 1986

Related U.S. Application Data

[63] Continuation-in-part of Ser. No. 793,782, Nov. 1, 1985, abandoned.

[51] Int. Cl.$^5$ ................................................. B32B 3/00
[52] U.S. Cl. ....................................... 428/195; 428/282; 428/308.4; 428/424.2; 428/483; 428/524; 428/518; 428/908.8
[58] Field of Search ................... 428/424.2, 483, 308.4, 428/195, 578, 524, 908.8, 282

[56] References Cited

U.S. PATENT DOCUMENTS

| | | |
|---|---|---|
| 3,471,388 | 10/1969 | Koral . |
| 3,496,136 | 2/1970 | Susi et al. . |
| 3,542,718 | 11/1970 | Davis . |
| 3,626,023 | 12/1971 | Brizgys . |
| 3,681,124 | 8/1972 | Sello . |
| 3,759,873 | 9/1973 | Hudak . |
| 3,779,793 | 12/1973 | Hughes et al. . |
| 3,785,861 | 1/1974 | Tanimura et al. . |
| 3,804,810 | 4/1974 | Fryd . |
| 3,857,817 | 12/1974 | Henshaw et al. . |
| 3,862,261 | 1/1975 | Stoddard . |
| 3,882,189 | 5/1975 | Hudak . |
| 3,892,889 | 7/1975 | Cohnen et al. . |
| 3,899,611 | 8/1975 | Hall . |
| 3,912,790 | 10/1975 | Chang et al. . |
| 3,935,163 | 1/1976 | Spivack et al. . |
| 3,935,330 | 1/1976 | Smith et al. . |
| 4,017,556 | 4/1977 | Wang . |
| 4,021,405 | 5/1977 | Tucker et al. . |
| 4,021,505 | 5/1977 | Wang . |
| 4,038,220 | 7/1977 | Thompson . |
| 4,088,807 | 5/1978 | Sakata et al. . |
| 4,115,224 | 9/1978 | Havings et al. . |
| 4,256,788 | 3/1981 | Gras . |
| 4,288,631 | 9/1981 | Ching . |
| 4,338,263 | 7/1982 | Elmer . |
| 4,357,219 | 11/1982 | Sattler . |
| 4,369,286 | 1/1983 | Czepel et al. . |
| 4,387,194 | 6/1983 | Ottaviani et al. . |
| 4,409,077 | 10/1983 | Sakiyama et al. . |
| 4,410,572 | 10/1983 | Sasama et al. . |
| 4,421,780 | 12/1983 | Buzio et al. . |
| 4,425,207 | 1/1984 | Boeckeler et al. . |
| 4,425,466 | 1/1984 | Santer et al. . |
| 4,443,223 | 4/1984 | Kissling et al. . |
| 4,456,747 | 6/1986 | Didomenico . |
| 4,463,125 | 7/1986 | Stuchal . |
| 4,528,344 | 7/1985 | Chang ................................ 525/309 |
| 4,781,987 | 11/1988 | Bolgiano et al. .................. 428/424.6 |

*Primary Examiner*—P. C. Ives

[57] ABSTRACT

The present invention relates to surface coverings, and in particular to coverings which comprise treated polyurethane or other wear layers. A coating comprising an aminoplast which is preferably a melamine which is at least partially etherified with alkyl groups comprising 4 to 10 carbon atoms, a vinyl modifier resin, a polyol, and an acid catalyst is formed on a release surface and thermally cured. A crosslinkable wear layer composition is then cast on the cured layer and crosslinked, and the composite is transferred to a support surface. Surface coverings are produced which exhibit surprising resistance to common household stains, and also improved scratch resistance.

24 Claims, No Drawings

STAIN AND SCRATCH RESISTANT RESILIENT SURFACE COVERINGS

This application is a continuation-in-part of prior United States Application Ser. No. 793,782 filed 11/01/85, now abandoned.

The present invention relates to surface coverings, and more particularly to surface coverings which have improved scratch and stain resistance.

BACKGROUND OF THE INVENTION

Resilient surface coverings, and in particular resilient floor coverings, are well known in the art. The floor coverings which are in wide use today are primarily of vinyl construction and, although they can be constructed to have varying degrees of flexibility, they are "resilient" when compared to conventional natural materials, such as ceramic tile. A variety of such products are commercially available and these products have proved to exhibit good wear resistance; however, such coverings are not without certain deficiencies. For example, although vinyl flooring products have proved to be durable and stain resistant, they nevertheless tend to lose their glossy appearance through wear. A high-gloss appearance for a floor covering is often desired. Accordingly, the manufacturers of such materials have long sought to find improved floor coverings which exhibit good gloss retention.

One method of providing improved gloss retention is through the application of polyurethane or other wear layers to vinyl flooring structures. Such materials are durable and relatively scratch resistant, and they tend to retain their high-gloss appearance over a longer period of time than do vinyl-surfaced flooring structures. Nevertheless, these wear layers, and in particular polyurethane wear layers, also have certain drawbacks. For example, they are more susceptible to staining. Thus, when exposed to common household items likely to cause stains (such as ballpoint pen, lipstick, mustard, shoe polish and the like), polyurethane coatings tend to be more easily stained than vinyl coatings.

In recent years, industry has expended considerable effort to develop new and different types of coatings, including coatings based on aminoplast resins. Such materials include ureas and melamine-formaldehyde resins, such as melamines (triaminotriazines) which have been N-alkylated with formaldehyde to provide a methylolated or partially methylolated melamine. The methylol groups are then etherified or partially etherified to provide a crosslinkable material. Such coatings are generally fairly rigid, and have found wide use in coatings for automobiles, appliances and other fairly rigid types of surfaces. They have also been used in coatings for certain flexible substrates including paper, paperboard, metal foils, cellophanes and the like. However, such materials have never been successfully applied to flooring structures, and in particular to vinyl flooring structures or to vinyl flooring structures comprising polyurethane wear layers.

Accordingly, one objective of the present invention is to provide resilient surface coverings with protective coatings two-tenths of a mil or greater in thickness which will deform in conjunction with the surface coverings, yet which will provide improved scratch and stain resistance.

Another objective of the present invention is to provide flooring structures comprising composite wear surfaces whereby the wear layer material is provided with an improved scratch and stain-resistant character.

These and other advantages of the present invention will become apparent from the detailed description of preferred embodiments which follows.

SUMMARY OF THE INVENTION

The present invention relates to surface coverings, and in particular to floor coverings, which comprise polyurethane or other wear layers having coatings which comprise an aminoplast which preferably is a melamine-based aminoplast which is at least partially etherified with alkyl groups comprising 4 to 10 carbon atoms, a vinyl resin, a polyol, and an acid catalyst. This coating may be formed on a release surface and thermally cured. A crosslinkable wear layer composition, such as a polyurethane composition, may then be cast on the cured layer and crosslinked, and the composite can then be transferred to a support surface. Surface coverings are produced which exhibit surprising resistance to common household stains, and also improved scratch resistance.

DETAILED DESCRIPTION OF PREFERRED EMBODIMENTS

In one embodiment, the present invention relates to a resilient surface covering, said covering comprising a resilient support and a crosslinked wear layer adhered thereto, the upper portion of said wear layer comprising a protective coating derived from a composition comprising (1) an aminoplast, (2) a vinyl resin, (3) a polyol, and (4) a suitable catalyst, said protective coating having the ability to conform to the deflections of said wear layer, yet having improved scratch and stain resistance relative to the untreated wear layer.

In a second embodiment, the present invention relates to a process for providing a wear surface for a resilient surface covering, said process comprising the steps of providing a release carrier comprising a support surface and a release coating; disposing on said release coating a composition comprising (1) an aminoplast, (2) a vinyl resin, (3) a polyol, and (4) a suitable catalyst; at least partially thermally curing said composition; disposing a crosslinkable wear layer composition on said aminoplast layer; curing said wear layer; laminating said cured wear layer to a resilient support structure; and separating said release carrier from said wear layer, whereby said surface covering comprises a wear layer having a protective coating, said protective coating being flexible, and scratch and stain-resistant relative to the untreated wear layer.

The resilient surface coverings which may be prepared according to the present invention are related to those which are presently well-known in the art. Thus, they may comprise an underlying resilient support typical of those used to prepare vinyl flooring structures. Supports of this type may be derived from backing materials, plastisols, foamed plastisols, randomly dispersed vinyl particles, stencil disposed vinyl particles, and the like, the selection of such materials being well within the skill of an ordinary artisan.

The surface coverings will also comprise composite wear layer compositions. The major portion of the wear layer will comprise materials which are presently well known in the art. Examples of such materials are crosslinked wear layers derived from urethanes, acrylated or methacrylated urethanes, unsaturated polyesters, and the like, all of which are well known in the art. These wear layers may be crosslinkable by moisture-curing techniques, thermally induced free radical curing techniques, oxidative curing techniques, radiation-curing techniques, or a combination thereof.

The novelty of the present invention resides in the presence of a second protective layer on the conventional wear layer components. This second material is derived from an aminoplast resin, a polyol, an acid catalyst and a vinyl resin, and provides a flexible, yet scratch and stain-resistant upper surface. These aminoplast resins include both ureas and melamine-formaldehyde resins, although melamine-formaldehyde resins are preferred.

The resins which may be used to practice the present invention are referred to herein as "aminoplasts". With respect to melamine-formaldehyde resins, these materials may be partially or substantially methylolated, and the methylol groups may be partially or substantially etherified with methyl, ethyl, propyl, butyl, pentyl, hexyl, heptyl, octyl, nonyl, and decyl groups, isomers of these moieties, and mixtures thereof; however, these aminoplasts preferably will be at least partially etherified with a relatively long chain alkyl group having from about 4 to about 10 carbon atoms. These long-chain portions of the aminoplast assist in providing flexibility to the cured vinyl product.

With respect to both melamine and urea-based resins, many of these aminoplasts are commercially available and are sold, for example, as Cymel cross-linking agents by American Cyanamid Company and as Resimene resins by Monsanto Company.

The vinyl resins which will be utilized will be one of, or a combination of, resins which are well-known in the art. Examples of such resins are co-polymer solution vinyl resins derived from vinyl chloride and vinyl acetate. Resins of this type are sold by Union Carbide, and they may or may not contain hydroxyl or other functionality. One such available resin under the trade designations VAGH. Others might include VAGD, VROH and VYES resins. Examples of other resins are specialty resins such as the polyvinyl acetals (e.g., polyvinylbutyral), either alone or in combination with polyvinyl alcohol and/or polyvinyl acetate, and polyvinyl esters such as polyvinyl acetate. Such materials are well-known in the art as being amenable to application from solution; thus, they are distinguishable from dispersion grade and general purpose resins which are essentially insoluble in most conventional solvents. In essence, the vinyl resins should be suitable to enhance the flexibility and strength of the cured composition without adversely affecting the stain resistance.

The polyols which may be used to practice the present invention are alcohols which comprise two or more alcohol groups. For example, 1,6-hexanediol, 1,4-cyclohexane dimethanol, glycerine, neopentyl glycol, tripropylene glycol, 1,4-butanediol, trimethylolpropane, pentaerythritol, and many other polyols or esters of such polyols, such as neopentyl glycol ester and the like, may be utilized to practice the present invention, said polyols being well-known in the art.

The acid catalysts which may be used to catalyze the thermal curing reaction between the vinyl modifier resin, the aminoplast, the polyol and the wear layer surface are also well-known in the art. Examples of such catalysts are sulfonic acids, such as methanesulfonic acid and p-toluenesulfonic acid, and other acids such as citric acid, maleic acid, phthalic acid, etc. The catalysts may be used in the free acid form, but they may also be stabilized, such as by the use of an amine to neutralize the acid. Examples of such amines are ammonia, diisopropanol amine, and 2-amino-2-methyl-1-propanol. The only restriction is that the catalysts must be compatible with the other components of the system. Because these catalysts are all well-known by those skilled in the art, their selection will be within the capability of an ordinary artisan.

To practice the present invention, a release surface is provided for the aminoplast composition. For a very smooth surface, a polished chrome plate or a release paper coated with a polyalkylene material can be used, a particularly good example of the latter being polypropylene, such as polypropylene matted by calendering. For less glossy surfaces, other types of coated papers or belts may be used, examples of which are silicone, complexed chromium and methyl cellulose treated papers or belts. The selection of such materials is well within the skill of an ordinary artisan.

On to the release paper is cast a layer of aminoplast composition. Although the component ratios of the composition will have substantial variability, the composition will usually comprise from about 4 to 1 parts of vinyl resin for every 1 to 4 parts of the aminoplast-/polyol mixture. Further, the aminoplast/polyol mixture may comprise from about 5 to 1 parts of aminoplast for every 1 to 5 parts of polyol. Preferably, however, there will be from about 3.5 to 1 parts of vinyl resin for every 1 to 2 parts of aminoplast/polyl having a ratio of from about 3 to 1 parts of aminoplast for every 1 to 3 parts of polyol. Usually this composition will be provided in an organic solvent; however, it is also possible to apply the composition in aqueous form.

After the aminoplast composition is applied to the release paper, it is dried and at least partially cured at about 250° F. Although it is possible to form the laminates of the present invention using partially cured aminoplast layers to obtain a high quality product, it is usually preferable to ensure that the aminoplast layer is fully cured prior to the deposition of the urethane layer.

The crosslinkable wear layer coating composition may be disposed directly on the aminoplast layer after the aminoplast layer is cured. It is noted, however, that the artisan may optionally elect to pretreat the surface of the cured aminoplast layer by corona discharge or by applying a key coat composition so as to promote adhesion between the layers. The latter compositions, which typically are vinyl lacquers, are in wide use and are well-known to those skilled in the art. Such compositions often comprise vinyl chloride copolymer solution resins such as the VAGH resin described above.

Corona discharge is also well-known in the art and involves a raising of the surface energy by exposing the surface to an electrical arc. The amount of energy necessary to promote good adhesion may be readily determined by standard means. Thus, the surface tension of the coating composition may be determined according to ASTM D 1331 and the surface energy of the surface to be coated may be determined essentially as described in ASTM D 2578. The objective is to raise the surface energy of the surface to be coated such that it will be wetted by the coating composition. Ideally the surface energy resulting from the corona treatment will be at least about 10 dynes/cm greater than the surface tension of the coating composition.

The thickness of application of the wear layer composition can vary from about 1 to about 8 mils, but preferably will vary from about 2.5 to about 4.5 mils.

The composition may be a low solids (e.g. 40%) solution of polyether or polyester-based urethane which is moisture curable, or it may comprise a 2-component system such as a polyester comprising hydroxyl functionality combined with a diisocyanate. Curing of the latter composition occurs by reaction of the diisocyanate with the hydroxyl groups of the polyester, as well as with moisture in the air. Alternatively, radiation curable, or combined radiation and moisture curable, components can be utilized. As with the aminoplast layer, it is also advisable to ensure that the urethane layer is fully cured before lamination to the resilient surface covering is achieved.

When fully cured materials are prepared and then laminated to resilient surface coverings, occasional poor adherence of the laminate to the surface covering has been encountered. As with the aminoplast layer and wear layer, it has been found desirable to avoid delamination problems by providing a key coat between the back (exposed) surface of the wear layer and the resilient layer with which it is interfaced. As an alternative, corona discharge treatement is also available to facilitate adhesion of the coats.

The upward facing wear layer is interfaced with the resilient support surface layer, with or without an intervening key coat or corona discharge treatment, and the composite material is subjected to heat and pressure to ensure firm adhesion. The composite material may also be affixed to granular or consolidated stencil vinyl products in the same manner. After consolidation is complete, the release paper is stripped from the hot sample to provide a decorative surface covering which exhibits good scratch and stain resistance. Thus, the materials are resistant to staining by household items such as lipstick, mustard, shoe polish, food dye and the like.

The present invention will be better understood by reference to the examples which follow, said examples being provided by way of illustration and not limitation.

EXAMPLES

EXAMPLE 1

Compositions were prepared as set out in Table 1 comprising each of the indicated components in parts by weight.

TABLE 1

| Component | 1-1 | 1-2 | 1-3 | 1-4 | 1-5 | 1-6 | 1-7 | 1-8 | 1-9 |
|---|---|---|---|---|---|---|---|---|---|
| Xylol | 31.0 | 31.2 | 31.2 | 22.9 | 31.3 | 16.0 | 16.0 | 20.0 | 20.0 |
| Vinyl chloride/vinyl acetate copolymer (VAGH from Union Carbide) | — | 13.6 | 13.6 | 13.6 | 19.3 | — | — | 13.6 | 13.6 |
| UV stabilizer (Uvitex OB; 1% in xylol) | 1.0 | 1.0 | 1.0 | 1.0 | 1.0 | 1.0 | 1.0 | 1.0 | 1.0 |
| Organotin stabilizer (Thermolite 31 from Metal and Thermit Co.) | — | 0.25 | 0.25 | 0.25 | 0.35 | — | — | 0.25 | 0.25 |
| Fluorocarbon surfactant (FC-430 from 3-M Company; 1% in xylol) | 1.0 | 0.8 | 0.8 | 0.76 | 0.8 | 1.0 | 1.0 | 0.80 | 0.80 |
| Methyl isobutyl ketone | 35.0 | 40.10 | 38.40 | 34.00* | 55.50 | 18.17 | 18.17 | 22.07 | 22.07 |
| Diacetone alcohol | 8.0 | 8.0 | 8.0 | 14.0 | 8.0 | 8.0 | 8.0 | 8.0 | 8.0 |
| Isopropyl alcohol | 3.6 | 3.6 | 3.6 | — | 3.5 | 3.6 | 3.6 | 3.6 | 3.6 |
| Aminoplast resin | | | | | | | | | |
| Resimene 755 | 15.3 | 5.1 | — | 20.4 | 4.13 | — | — | — | — |
| Resimene 980 | — | — | — | — | — | 15.30 | — | 5.1 | — |
| Resimene 915 (from Monsanto) | — | — | — | — | — | — | 20.4 | — | 6.8 |
| Cymel 301 (from American Cyanamid) | — | — | 5.1 | — | — | — | — | — | — |
| Cyclohexane dimethanol (90% in water) | 5.1 | 1.7 | — | 6.8 | 1.38 | 5.1 | 5.1 | 1.7 | 1.7 |
| 1,6-Hexanediol | — | — | 1.7 | — | — | — | — | — | — |
| p-Toluenesulfonic acid (25% in 1:1 xylol/isopropyl alcohol | 2.9 | 0.9 | 0.9 | 3.8 | 0.8 | 2.9 | 2.9 | 0.9 | 0.9 |
| Viscosity, #2 Zahn cup (seconds) | 15 | 23 | 30 | 30 | 35 | 15.0 | 16.0 | — | — |
| #3 Zahn | — | — | — | — | — | — | — | 31 | 30 |
| Total Solids (%) | 20.6 | 19.7 | 19.8 | 35.9 | 20.3 | 29.3 | 27.17 | 27.0 | 26.42 |
| Ratio of vinyl copolymer to total melamine plus diol | — | 2:1 | 2:1 | 1:2 | 3.5:1 | — | — | 2:1 | 2:1 |

*Methyl ethyl ketone may be substituted for methyl isobutyl ketone

Each of a series of polypropylene-coated release papers was provided with a coating of samples 1—1 through 1–5 at a wet thickness of about 2.5 to 3.5 mils using a reverse roll coater. The coated paper was then passed through a 260° F. oven such that the coating resided in the oven for 4 minutes.

A moisture-curable polyurethane coating composition as set out in Table 2 was prepared for application to the coated release papers.

TABLE 2

| Component | Weight (Grams) |
|---|---|
| Polyetherdiol (Union Carbide LHT 240) | 40.80 |
| Polyetherdiol (Union Carbide LHT 112) | 14.20 |
| Xylene solvent | 110.00 |
| Toluene solvent | 46.00 |
| Dimethyltin dineodecanoate catalyst (Witco UL-28) | 0.55 |
| Surfactant (Monsanto XA-677 Multiflow) | 0.30 |
| Light stabilizer (American Cyanamid UV-5411) | 0.20 |

These components were charged to a stirred, nitrogen-purged glass reactor and heated to 70° C. for one hour. A 44.90 gram quantity of 4,4'-diisocyanato dicylohexylmethane was added dropwise over a 30 minute period of time at a rate sufficient to maintain the temperature of the mixture at 70° C. After an additional two-hour period of stirring and heating at 70° C., the product was cooled.

To each of the aminoplast coated release papers was applied a 1 to 2.5 mil wet layer of key coat lacquer comprising 18.54 percent by weight of VAGH resin, 0.37 percent Thermolite 31, 0.0094 percent Uvitex OB and 81.08 percent methyl isobutyl ketone solvent. The coated sample was then dried in ambient air or under low heat to remove the solvent. Upon completion of the drying step, each paper was provided with a 5 to 6.5 mil wet coating of the moisture curable polyurethane material described above. The coated samples were then passed through a 250° F. oven to completely dry the sample, the dwell time in the oven being 7 minutes.

Coatings of samples of b 1-6 through b 1-9 were prepared on polypropylene coated paper using a #30 wire wound rod drawn to obtain coatings 0.5 mil in thickness when dried. The samples were then cured at 250° F. for five minutes. Sample 1-6 delaminated completely and was discarded. The remaining samples were coated with a moisture-curable polyurethane coating composition as given above.

The lamination and consolidation steps for laboratory evaluations involved the use of a 12 inch × 12 inch press to prepare 9 inch × 9 inch samples. The top platen of the press was heated at 310° F. whereas the bottom platen was heated at 800° F. The dwell time in the press was b 10 seconds at 250 pounds pressure, followed by 10 seconds at 1,200 pounds of pressure. Following removal of the sample from the press, the release paper was stripped from the hot sample.

Both stencil vinyl and gelled vinyl plastisol resilient support materials may be used for lamination with the above coatings, and stain resistance. Was evaluated using ordinary household stains. Although sample 1-7 was clearly more susceptible to staining than the others, all samples showed superior stain resistance as compared to the untreated polyurethane material, and also showed good scratch resistance.

EXAMPLE 2

Two coating compositions having the compositions set forth for sample 1-2 and 1-4 were prepared and each coating was applied to a polypropylene surface release paper using a forward roll coater. Each release paper was passed twice through the coater in order to obtain a total dry film thickness of 0.25 mils. Curing was obtained by passing the coated sheets through a 250°-260° F. oven at a dwell time of 1.5 minutes for each coating. Two rolls of paper were prepared, each being provided with one of the two coatings.

Each of the rolls was treated such that one-half of each was coated with the vinyl key coat composition described in Example 1 and the other half was treated with corona discharge. The key coated portions of the roll were provided as described in Example 1, the drying of the coating being accomplished in an oven at a dwell time of less than one minute. The corona discharge exposure for the remaining portions of the rolls was 9.1 watts/square foot/minute such that the surface energy was about 55 dynes/cm.

Following the application of the key coat and the corona treatment, all rolls were coated with a 8.2 mil wet thickness of the polyurethane coating described in Example 1 and the coating was cured as described in that example. The entire surface of each roll was then provided with a vinyl key coat as described above and the coated material was interfaced with a granular stencil vinyl mixed. Consolidation was achieved as described in Example 1. The resulting products demonstrated good stain and scratch resistance and the coating was firmly adhered to the substrate.

EXAMPLE 3

Coating compositions were prepared having the following components.

| Component | \multicolumn{5}{c}{Sample No.} | | | | |
|---|---|---|---|---|---|
| | 3-1 | 3-2 | 3-3 | 3-4 | 3-5 |
| Toluene | 28.10 | 28.10 | 28.10 | 23.60 | 29.05 |
| Butyl acetate | 42.14 | 42.14 | 42.14 | 34.98 | 43.54 |
| Isopropyl alcohol | 6.32 | 6.32 | 6.32 | 5.34 | 6.56 |
| Organotin stabilizer (Thermolite 31) | 0.21 | 0.21 | 0.21 | 0.21 | 0.27 |
| Vinyl chloride/vinyl acetate copolymer (VAGH) | 14.46 | 14.46 | 14.46 | 11.15 | 14.74 |
| UV stabilizer (Uvitex OB) | 1.06 | 1.06 | 1.06 | 1.67 | 1.12 |
| Fluorocarbon surfactant (FC-430) | 0.50 | 0.50 | 0.50 | 0.77 | 0.53 |
| Aminoplast resin | | | | | |
| Resimene 755 | 5.40 | — | — | 16.72 | 3.16 |
| Cymel 1130 (from Cyanamid) | — | — | 5.4 | — | — |
| Cymel 1133 (from Cyanamid) | — | 5.40 | — | — | — |
| Cyclohexane dimethanol (90% in water) | 1.81 | 1.81 | 1.81 | 5.57 | 1.05 |
| p-Toluenesulfonic acid (25% in 1:1 xylol/isopropyl alcohol) | 0.25 | 0.25 | 0.25 | 0.78 | 0.15 |
| Total Solids (%) | 21.67 | 21.67 | 21.67 | 33.44 | 19.20 |
| Ratio of vinyl copolymer to total melamine plus diol | 2:1 | 2:1 | 2:1 | 1:2 | 3.5:1 |

Three sets of samples were prepared following the procedure of Example 1, but using each of the above five coatings. One set of samples was provided wherein the cured coating on a release paper was corona treated prior to coating with the polyurethane layer of Example 1; a second structure was provided wherein a key coat of Example 1 was used between the cured coating on the release paper and the polyurethane layer; and a third set of samples was prepared wherein neither a key coat nor a corona treatment was used between the melamine-containing layer and the polyurethane layer. In all cases, excellent stain resistance was noted and better adhesion of the melamine-containing layer to the polyurethane layer was obtained where keycoating or corona treatment was employed.

The present invention is not restricted solely to the descriptions and illustrations provided above, but encompasses all modifications envisaged by the following claims.

What is claimed is:

1. A surface covering comprising a resilient support and a crosslinked wear layer adhered thereto, the upper portion of the wear layer being formed from a composition comprising:
   (a) an aminoplast,
   (b) a vinyl resin,
   (c) a polyol,
   (d) a catalyst, and
   (e) a solvent, the solvent comprising at least 64% by weight of the composition.

2. The surface covering of claim 1 wherein the aminoplast is a melamine.

3. The surface covering of claim 2 wherein the melamine is alkyl etherified with alkyl groups comprising 1 to 10 carbon atoms.

4. The surface covering of claim 3 wherein the melamine which is alkyl etherified with alkyl groups comprising 1 to 4 carbon atoms.

5. The surface covering of claim 1 in which the crosslinked wear layer is a composite, the lower portion of the wear layer disposed between the upper portion of the wear layer and the resilient support is derived from materials selected from the group consisting of urethanes, acrylated urethanes, methacrylated urethanes and unsaturated polyesters.

6. The surface covering of claim 1 wherein the vinyl resin is a copolymer of vinyl chloride and vinyl acetate.

7. The surface coating of claim 1 wherein the vinyl resin is selected from the group consisting of polyvinyl acetal, polyvinyl ester and a combination of polyvinyl acetal with polyvinyl alcohol or polyvinyl ester.

8. The surface covering of claim 1 wherein the ratio of vinyl resin to aminoplast/polyol mixture is from 4 to 0.25 by weight.

9. The surface covering of claim 1 wherein the ratio of aminoplast to polyol is from 5 to 0.2 by weight.

10. The surface covering of claim 1 wherein the ratio of vinyl resin to aminoplast/polyol is from 3.5 to 0.33 by weight, and the ratio of aminoplast to polyol is from 3 to 0.33 by weight.

11. The surface covering of claim 1 wherein the ratio of vinyl resin to aminoplast/polyol is from 3.5 to 0.5 by weight and the ratio of aminoplast to polyol is from 3 to 0.33 by weight.

12. The surface covering of claim 1 wherein adhesion between the crosslinked wear layer and the resilient support is facilitated by a key coat layer.

13. The surface covering of claim 5 wherein the upper portion of the wear layer receives a corona discharge pretreatment prior to disposition of the lower portion of the wear layer thereto.

14. The surface covering of claim 13 in which a key coat layer is disposed between the wear layer and the resilient support.

15. The surface covering of claim 14 wherein the resilient support comprises a resilient carrier and a decorative layer comprising vinyl resin and pigments.

16. The surface covering of claim 15 wherein the upper portion of the wear layer is 0.2 to 1.5 mil thick and comprises the reaction product of a composition including (a) a melamine aminoplast, (b) a vinyl copolymer resin, (c) a polyol, and (d) p-toluenesulfonic acid catalyst; the lower portion of the wear layer is a moisture cured polyurethane wear layer; the key coat layer comprises a vinyl chloride/vinyl acetate copolymer resin; and the vinyl resin of the decorative layer is a vinyl chloride/vinyl acetate copolymer resin.

17. The surface covering of claim 16 wherein (b) is a vinyl chloride/vinyl acetate copolymer resin.

18. The surface covering of claim 17 wherein the resilient carrier is felt.

19. The surface covering of claim 17 wherein the resilient carrier is foam.

20. The surface covering of claim 17 wherein the polyol is cyclohexane dimethanol.

21. The surface covering of claim 17 wherein the polyol is an esterdiol.

22. The surface covering of claim 1 wherein the aminoplast is a urea resin.

23. The surface covering of claim 1 wherein the upper portion of the wear layer receives a corona discharge pretreatment prior to disposition of the lower portion of the wear layer thereto.

24. A surface covering comprising a resilient support and a crosslinked wear layer adhered thereto, the upper portion of the wear layer being the reaction product of a composition consisting essentially of:
   (a) an aminoplast,
   (b) a vinyl resin, and
   (c) a polyol.

* * * * *

UNITED STATES PATENT AND TRADEMARK OFFICE
CERTIFICATE OF CORRECTION

PATENT NO. : 4,935,286
DATED : June 19, 1990
INVENTOR(S) : Jack H. Witman

It is certified that error appears in the above-identified patent and that said Letters Patent is hereby corrected as shown below:

Column 6, Table 1, the line following "(FC-430 from 3-M Company"; the "1%" should read --10%--.

Column 7, line 15, delete "b" before "1-6" and "1-9".

Column 7, line 27, the number "800"°F should read -- 300 --°F.

Column 7, line 28, delete "b" before "10 seconds".

Column 7, line 63, the number "8.2" should read -- 3.2 --.

Signed and Sealed this

Twenty-third Day of July, 1991

Attest:

HARRY F. MANBECK, JR.

*Attesting Officer*   Commissioner of Patents and Trademarks